United States Patent [19]

Eidmann et al.

[11] Patent Number: 4,782,612
[45] Date of Patent: Nov. 8, 1988

[54] IDENTIFICATION TAG

[76] Inventors: James F. Eidmann; John C. Eidmann; Robert P. Eidmann, all of Star Rte. #3, Orrin, N. Dak. 58359

[21] Appl. No.: 888,323

[22] Filed: Jul. 21, 1986

[51] Int. Cl.⁴ .............................................. G09F 3/00
[52] U.S. Cl. ................................................... 40/300
[58] Field of Search ............... 40/21 R, 21 C, 300, 40/303, 304, 586, 316, 322, 317; 119/106, 105; 63/5 R, 5 A, DIG. 3

[56] References Cited

U.S. PATENT DOCUMENTS

| | | | |
|---|---|---|---|
| 990,059 | 4/1911 | Masko | 40/317 X |
| 1,395,333 | 11/1921 | Bayerdorffer | 40/304 |
| 2,254,465 | 9/1941 | Woodrich | 119/105 |
| 2,551,384 | 5/1951 | Middleton et al. | 16/87.2 |
| 2,629,953 | 3/1953 | Stackelberg et al. | 40/21 R |
| 2,709,812 | 6/1955 | Kanzow | 2/52 |
| 3,916,550 | 11/1975 | Dzus | 40/300 |
| 4,328,767 | 5/1982 | Peterson | 119/109 |
| 4,352,253 | 10/1982 | Oswalt | 40/300 |

FOREIGN PATENT DOCUMENTS

| | | | |
|---|---|---|---|
| 2842946 | 4/1980 | Fed. Rep. of Germany | 40/304 |
| 221283 | 7/1968 | Sweden | 40/316 |
| 1111418 | 4/1968 | United Kingdom | 40/300 |

Primary Examiner—John E. Murtagh
Assistant Examiner—Andrew Joseph Rudy
Attorney, Agent, or Firm—Robert E. Kleve

[57] ABSTRACT

The invention comprises an animal identification tag. The tag is a plastic sheet preformed into a sspiral shape to form several overlapping spiral layers from one end to the other. The sheet is formed of resilient material whereby the outer spiral layer may be separated from the next adjacent layer along its outer edge so that a cow's tail of conventional size may be slipped between laterally of the length of the tail and the tag may be rotated to slide the tail between the spiral layers until the tail is located inside the innermost spiral layer. The tag has a preformed spiral shape wherein the innermost spiral layer has a diameter when unstraightened that is slightly smaller than the outside diameter of a small cow's tail so that the tag will compress back, after straightening, toward its smaller diameter and thereby snuggly engage the tail of cows of varying sizes to retain the tag on the tail. The tag has indicia along its outermost spiral layer to identify the cow.

2 Claims, 1 Drawing Sheet

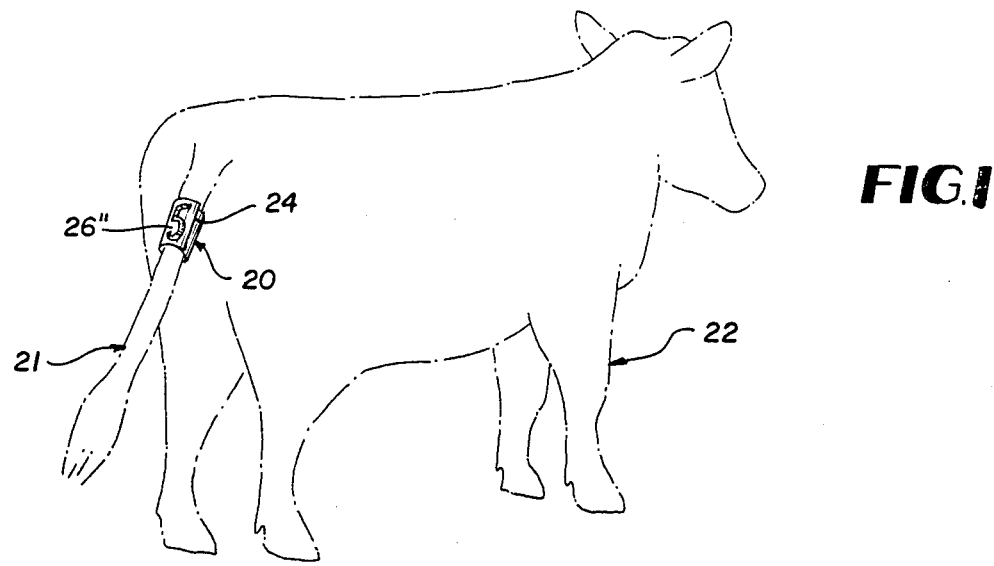
FIG.1
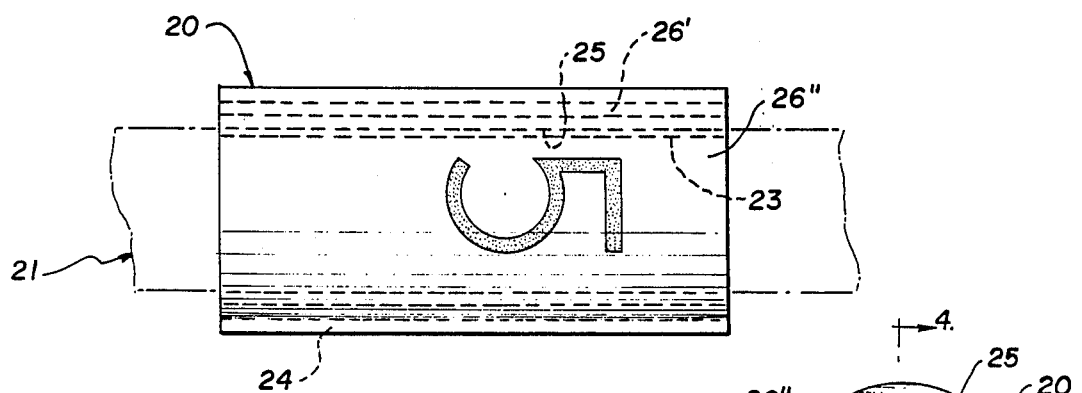
FIG.2
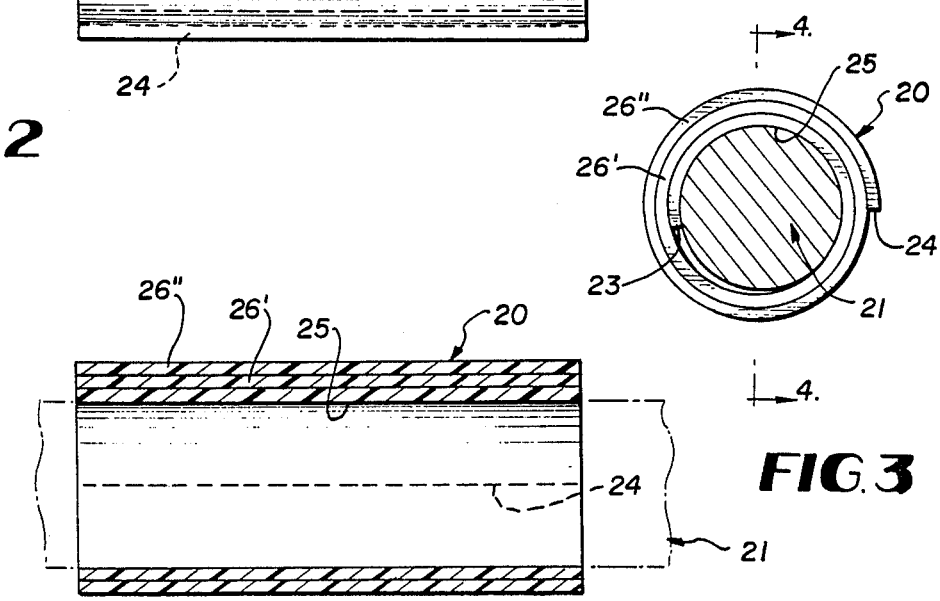
FIG.3
FIG.4 divide # IDENTIFICATION TAG

SUMMARY OF THE INVENTION

This invention relates to identification devices, more particularly, the invention relates to animal identification tag devices.

It is an object of the invention to provide a novel cattle identification tag which an be easily and quickly attached to the tail of cattle without mutilation or harm to cattle.

It is another object of the invention to provide a novel spiral shaped resilient identification tag sheet for attachment to the tail of an animal to provide an identification tag of the animal.

It is another object of the invention to provide a novel identification tag which can be slipped over the tail of an animal laterally of the length of the tail easily and quickly and which automatically grasps the tail to frictionally be retained thereon.

Further objects and advantages of the invention will become apparent as the description proceeds and when taken in conjunction with the accompanying drawing wherein;

BRIEF DESCRIPTION OF THE DRAWINGS

FIG. 1 is a perspective view of the animal identification tag invention illustrating it attached to the tail of a cow for identification of the cow.

FIG. 2 is an enlarged side elevational view of the spiral shaped identification tag mounted on the tail of an animal.

FIG. 3 is an end view of the tag illustrating its spiral shape and shown attached to a tail of an animal.

FIG. 4 is a cross-sectional view taken along line 4—4 of FIG. 3.

DESCRIPTION OF THE PREFERRED EMBODIMENT

Briefly stated, the invention comprises a spiral shaped identication tag for attachment to the tail of cattle and other animals. The tag is a resilient sheet preformed into a spiral shape. said tag being attachable to the tail by being capable of being straightened out from its spiral shape with a minimum amount of force sufficiently to enable the tail of an animal to be slid between the outer edge of the spiral outer layer of the tag and then by rotating the tag while sliding the tail of the animal along the spiral layers until the tail slides inside the innermost layer of the tag by sliding out the inner edge 23, said tag having a radius in its performed shape along its innermost layer which is less than the radius of the tail of a small cow to that the tag upon release from the innermost edge into the inside of the tag will he caused to compress back into its spiral shape to frictionally engage about the tail of the cow when mounted thereon to retain the tag on the tail, said tag having a length from its inner end to its outer end along its spiral layers which is greater than the circumference of the tail of a small cow so as to entirely encircle it.

Referring more particularly to the drawings, in FIG. 1, the spiral shaped tag 20 is illustrated mounted or attached to the tail 21 of a cow 22. The tag 20 is made of plastic resilient material and is preformed into a spiral shape which when free of external pressure assumes a spiral shape. The tag 20 is of a length from its innermost edge 23 to its outermost edge 24 that is greater than the circumference of the tail of a small cow or calve, so that the inner and outer ends assume an overlapping relation when the tag is attached to the tail of s small cow, and so that it may be expanded for attachment to a larger tail of a large cow and still be or stay mounted in overlapping relation to thereby completely encircle the tail of the cow and be adaptable to various size cows or calves. The tag is preformed so that its circumference or radius of its innermost layer 25, when the tag is in its preformed position, is sufficiently and significantly smaller that the outside circumference or radius of the tail of an average smaller cow or calf, whereby once the the tag layers have been expanded to attach the tag to the tail and the tail has been slid out the inner edge 23 of the tag into the inside radius so the tag is now free of expanding pressure on its layers, it will compress back toward its smaller preformed shape thereby reducing its inner diameter until the innermost layer of the tag engages the exterior of the tail of the cow with sufficient compressing action to frictionally retain the tag in place on the tail of the cow.

The spiral identification tag 20 is attached to the tail 21 of a cow, for example, by forcably straightening out the sheet sufficiently to enable the cow's tail to be placed, laterally of its length, between the outermost edge 24 of the sheet and the next adjacent layer 26' and then rotating the tag relative to the tail to slide the tail along the spiral layers until the tail is slides out the edge 23 and is located inside the innermost layer 25, as illustrated in the drawing. Once the tail is inside the innermost layer by sliding out the inner edge, this releases any external pressure on the tag between the layers, so that the tag is free to resume its preformed position, and it will thereupon compress back toward it and in so doing will compress about and engage against the tail of the cow, thereby retaining frictionally the tag in its place.

Numeral or word identification, as illustrated, will be printed on the exterior of the outermost surface 26'' of the outermost spiral layer 26' of the tag sheet for identification of the cow or other animal.

The tag is relatively smooth in its outer surface and imperforate and the outermost edge 24 will overlap the next inner layer 26' in close flush relationship to the next inner layer 26' to prevent objects from catching on the outer edge of the tag. The tag however will have enough flexibility so that if it is caught on an object and does not release, the tag will flex sufficiently straight so that it can sllide off the tail of the cow without injury to the cow. The spiral sheet will have a thickness that is relatively thin in relation to the radius of the tag from its center to its inside surface and so as to make it more flexible and to provide more layers per given radius so that it will expand further and therby accomodate a greater range of size cow's tail.

It will be obvious that various changes and departures may be made to the invention without departing from the spirit and scope thereof and accordingly, it is not intended that the invention be limited to that specifically described in the specification or as illustrated in the drawings but only as set forth in the appended claims wherein

What is claimed is:

1. An animal identification tag for attachment to a cow's tail by spiral encirclement about the cow's tail comprising a resilient sheet resiliently biased in length into a spiral path of overlapping layers of connecting curves circling about a central point in one plane with said curves constantly increasing in size; said sheet having an innermost end and an outermost end in said spirial; said sheet having its smallest curve at its innermost end of the spiral and its largest at its outermost end; said sheet having a length in excess of its circumference and a width in excess of its circumference; said tag, in its biased position, having its smallest curve smaller in diameter than the outside diameter of the cow's tail with said tag's resilient biasing thereby acting to contract the tag, when the tag is encircled about the cow's tail, toward its position that is smaller than the outside diameter of the cow's tail to frictionally engage the tag about the cow's tail and with said bias having sufficient force to frictionally retain the tag in position on the cow's tail; said tag having its layers sufficiently separable and straightenable from one another whereby the tail of the cow may be slipped laterally of the length of the tail between the outermost end of the spiral tag and the next adjacent layer and the tag may be rotated relative to the tail to slide the tail along the spiral sheet between the layers until the tail slides out the innermost end of the sheet into the inside of the tag to be spirally encircled by the innermost curved layer of the spiral tag; indicia along the outside of the outermost layer to identify the cow.

2. An animal identification tag according to claim 1 wherein said sheet has a thickness relatively narrow in relation to its length and width.

* * * * *